US008639559B2

(12) United States Patent
Kandogan et al.

(10) Patent No.: US 8,639,559 B2
(45) Date of Patent: *Jan. 28, 2014

(54) BRAND ANALYSIS USING INTERACTIONS WITH SEARCH RESULT ITEMS

(75) Inventors: Eser Kandogan, Mountain View, CA (US); Jalal U. Mahmud, San Jose, CA (US); Barton A. Smith, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,348

(22) Filed: Apr. 9, 2012

(65) Prior Publication Data

US 2013/0268314 A1    Oct. 10, 2013

(51) Int. Cl.
*G06Q 10/00* (2012.01)
(52) U.S. Cl.
USPC .................. 705/7.29; 705/7.11; 705/7.39
(58) Field of Classification Search
USPC .................. 705/7.11–7.42; 707/748–781
See application file for complete search history.

(56) References Cited

U.S. PATENT DOCUMENTS

| | | | | |
|---|---|---|---|---|
| 5,583,763 A * | 12/1996 | Atcheson et al. | ............. | 707/750 |
| 6,029,195 A * | 2/2000 | Herz | ............................ | 725/116 |
| 6,489,968 B1 * | 12/2002 | Ortega et al. | ................ | 715/713 |
| 7,188,141 B2 * | 3/2007 | Novaes | ......................... | 709/205 |
| 7,249,126 B1 * | 7/2007 | Ginsburg et al. | ............ | 707/749 |
| 7,966,341 B2 * | 6/2011 | Maghoul et al. | ............. | 707/768 |
| 8,001,152 B1 * | 8/2011 | Solan | ............................ | 707/791 |
| 8,280,871 B2 * | 10/2012 | Parikh et al. | ................... | 707/708 |
| 2002/0123930 A1 * | 9/2002 | Boyd et al. | ...................... | 705/14 |
| 2002/0128959 A1 * | 9/2002 | Kostic et al. | .................... | 705/37 |
| 2003/0144994 A1 * | 7/2003 | Wen et al. | ......................... | 707/3 |
| 2004/0024751 A1 * | 2/2004 | Petrisor et al. | ................... | 707/3 |
| 2005/0251514 A1 * | 11/2005 | Houle | .............................. | 707/3 |
| 2007/0260520 A1 * | 11/2007 | Jha et al. | ......................... | 705/14 |
| 2008/0016101 A1 * | 1/2008 | Ginsburg et al. | ............ | 707/102 |
| 2008/0115057 A1 * | 5/2008 | Grandhi et al. | .............. | 715/272 |
| 2008/0288331 A1 | 11/2008 | Magids et al. | | |
| 2009/0012839 A1 | 1/2009 | Fusillo et al. | | |
| 2009/0106085 A1 | 4/2009 | Raimbeault | | |

(Continued)

OTHER PUBLICATIONS

Non-Final Office Action received for U.S. Appl. No. 13/587,305 dated Nov. 19, 2012.

(Continued)

*Primary Examiner* — Alan S Miller
(74) *Attorney, Agent, or Firm* — Fleit Gibbons Gutman Bongini & Bianco PL; Thomas Grzesik; Jose Gutman (57) ABSTRACT

Embodiments of the invention relate to performing brand analysis based on user's interactions with search results. In one embodiment, at least one search result list is analyzed. The search result includes a set of items corresponding to at least one search request submitted by at least one user. The set of items in the at least one search result list is determined to include at least one item corresponding to a brand analysis target item, and at least one other item. A selection by the at least one user of one of the brand analysis target item and the other item from the at least one search result list is recorded for the at least one search result list. A brand analysis metric is generated based on the recording. The brand analysis metric indicates a ratio of selections between the brand analysis target item and the other item.

13 Claims, 8 Drawing Sheets

(56) References Cited

U.S. PATENT DOCUMENTS

| | | |
|---|---|---|
| 2009/0119156 A1 | 5/2009 | Dulepet |
| 2009/0192985 A1* | 7/2009 | Bolls et al. ............... 707/3 |
| 2011/0178965 A1* | 7/2011 | Pucher ..................... 706/12 |
| 2011/0193795 A1* | 8/2011 | Seidman et al. ......... 345/173 |
| 2011/0208822 A1 | 8/2011 | Rathod |
| 2011/0258049 A1* | 10/2011 | Ramer et al. ........... 705/14.66 |
| 2012/0089584 A1* | 4/2012 | Yoon et al. ............... 707/706 |

OTHER PUBLICATIONS

Non Final Office Action dated Mar. 28, 2013 received for U.S. Appl. No. 13/587,305.

* cited by examiner

BRAND ANALYSIS USING INTERACTIONS WITH SEARCH RESULT ITEMS

BACKGROUND

The present invention generally relates to brand analysis, and more particularly relates to brand analysis based on search results.

BRIEF SUMMARY

In one embodiment a method is disclosed. The method comprises analyzing at least one search result list. The search result list comprises a set of items corresponding to at least one search request submitted by at least one user. The set of items in the at least one search result list is determined to comprise at least one item corresponding to a brand analysis target item, and at least one other item. A selection by the at least one user of one of the brand analysis target item and the other item from the at least one search result list is recorded and associated with the at least one search result list. A brand analysis metric is generated based on the recording. The brand analysis metric indicates a ratio of selections by the at least one user between the brand analysis target item and the at least one other item.

In another embodiment a system is disclosed. The system comprises memory and a processor that is communicatively coupled to the memory. A brand analysis manager is communicatively coupled to the memory and the processor. The brand analysis manager and the processor are configured to analyze at least one search result list. The search result list comprises a set of items corresponding to at least one search request submitted by at least one user. The set of items in the at least one search result list is determined to comprise at least one item corresponding to a brand analysis target item, and at least one other item. A selection by the at least one user of one of the brand analysis target item and the other item from the at least one search result list is recorded and associated with the at least one search result list. A brand analysis metric is generated based on the recording. The brand analysis metric indicates a ratio of selections by the at least one user between the brand analysis target item and the at least one other item.

In yet another embodiment, a computer program product comprising a computer readable storage medium having computer readable program code embodied therewith is disclosed. The computer readable program code comprises computer readable program code configured to analyze at least one search result list. The search result comprises a set of items corresponding to at least one search request submitted by at least one user. The set of items in the at least one search result list is determined to comprise at least one item corresponding to a brand analysis target item, and at least one other item. A selection by the at least one user of one of the brand analysis target item and the other item from the at least one search result list is recorded and associated with the at least one search result list. A brand analysis metric is generated based on the recording. The brand analysis metric indicates a ratio of selections by the at least one user between the brand analysis target item and the at least one other item.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
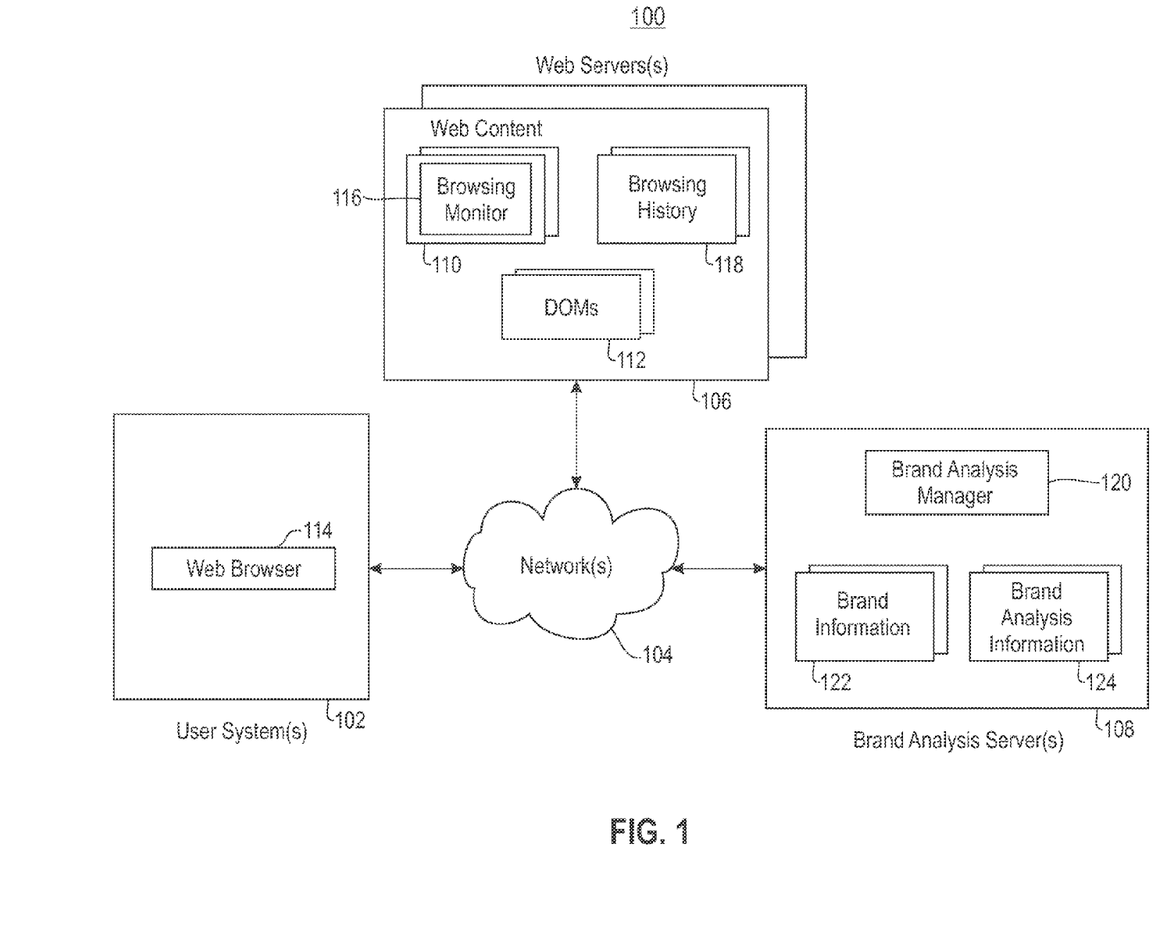
FIG. 1 is a block diagram illustrating one example of an operating environment according to one embodiment of the present invention.

FIG. 1 shows one example of an operating environment 100 applicable to various embodiments of the present invention. As shown, one or more user systems 102 are communicatively coupled to one or more networks 104. Additionally, a plurality of web servers 106 and one or more brand analysis servers are communicatively coupled to the network(s) 104 as well. The user system(s) 102, in one embodiment, is a personal computer, notebook computer, workstation, PDA, cellular phone capable of browsing the Internet, tablet computing device, and the like. The network(s) 104, in this embodiment, is a wide area network, local area network, wired area network, wireless network, the World Wide Web, and/or the like.

The web server(s) 106 comprises web content 110 and Document Object Models (DOMs) 112 associated with the web content 110. Web content can include, but is not limited to, websites and their web pages that are accessible by a user of the user system 102 via an application such as a web browser 114. It should be noted that web content 110 refers to any content that is displayable to the user via the web browser 112. The DOMs 112 define the logical structure of their associated web content and the way the web content can be manipulated and accessed. The web content 110 and/or DOMs 112 can reside within the web server 106 or on a system coupled to the web server 106.

In one embodiment, the web content 110 comprises a web browsing/interaction monitor 116. The web browsing monitor 116 monitors a user's browsing history with respect to the web content 110 comprising the monitor 116. Browsing history includes various actions taken by a user with respect to the web content 110 using the web browser 114. The browsing monitor 116 continually records web browsing history at the level of interactions, such as clicking on an item in an item list (e.g., a search result), entering a value into a form field, turning on a checkbox, clicking a button, etc. The information recorded by the browsing monitor 116 is stored as browsing history information 118 (also referred to herein as "web usage logs" or "web browsing interaction information") associated with that particular set of web content 110. In one embodiment, a website provider can track user activity by implementing a piece of code (e.g. Javascript code) within the web pages. This code can record users interaction and send the recorded information back to the web server. Examples of recorded information are pages users visit, their interactions in those pages, etc.

The server system(s) 108, in this embodiment, comprises a brand analysis manager 120, brand information 122, and brand analysis information 124. It should be noted that web content 110, DOMs 112, and browsing history information 118 can be transmitted to the server 108 from the web server 106 and stored thereon as well. The brand information 122 identifies the brands, products, etc. that are of interest for brand analysis. For example, this information 116 can identify that Brand_A is a target brand and Brand_B, Brand_C, and Brand_D are competitors to Brand_A. The brand analysis manager 120 uses the brand analysis manager 120 to determine which items to perform brand analysis operations on. It should be noted that throughout this discussion the term "item" with respect to target and competitors of brand analysis is used to refer to products, services, brand names, etc.

Figure 2:
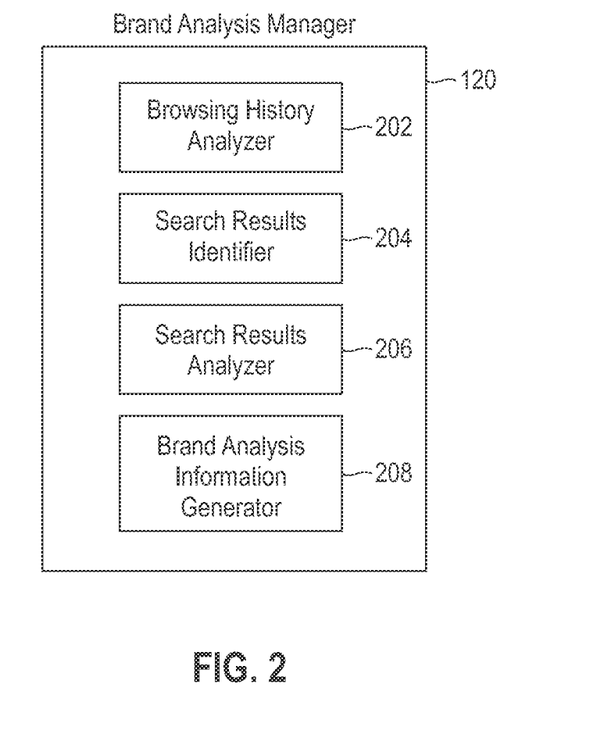
FIG. 2 illustrates a more detailed view of a brand analysis manager according to one embodiment of the present invention.

FIG. 2 shows a more detailed view of the brand analysis manager 120. In this embodiment, the brand analysis manager 120 comprises a browsing history analyzer 202, a search results identifier 204, a search results analyzer 206, and brand analysis information generator 208. The brand analysis manager 120 utilizes each of these component's to generate brand analysis information 124 for a given brand, product, etc. (as identified within the brand information 124) based on users' interactions with search results. In one embodiment, the brand analysis information 124 generated by the brand analysis manager 120 provides an indication as to the number of times users selected a target brand/product in search results as compared to a competitor's brand/product in the same search results. The brand analysis manager 120 and each of its components are discussed in greater detail below. It should be noted that one or more of the components shown in the server system 106 can also reside on the web server 106 as well.

Brand Analysis Based on User Interactions with Search Results

In one embodiment, the brand analysis manager 120 utilizes browsing history information 118 when generating brand analysis information 124. As discussed above, browsing history information 118 is generated by the browsing monitor 116. The brand analysis manager 120 generates brand analysis information 124 by leveraging browsing history information (interaction logs) 118 that is collected by recording a user's actions in web content 110, such as a web site, of interest. For example, the brand information 122 may indicate that the brand analysis manager 120 is to generate brand analysis information 124 for a particular website(s) or web pages of a web site.

The browsing history analyzer 202 of the brand analysis manager 120 analyzes the browsing history information 118 associated with the web content 110 of interest. If the browsing history information 118 is not stored locally on the server 106, the browsing history analyzer 202 can retrieve the information 118 from the web server 106. In this embodiment, the browsing history analyzer 202 analyzes the browsing history information 118 to identify the search processes performed by a user and their resulting search result pages. The search result pages can be identified from the Uniform Resource Locator (URL) of the page that includes the next action of the browsing history information 118 which follows the search process.

Figure 3:
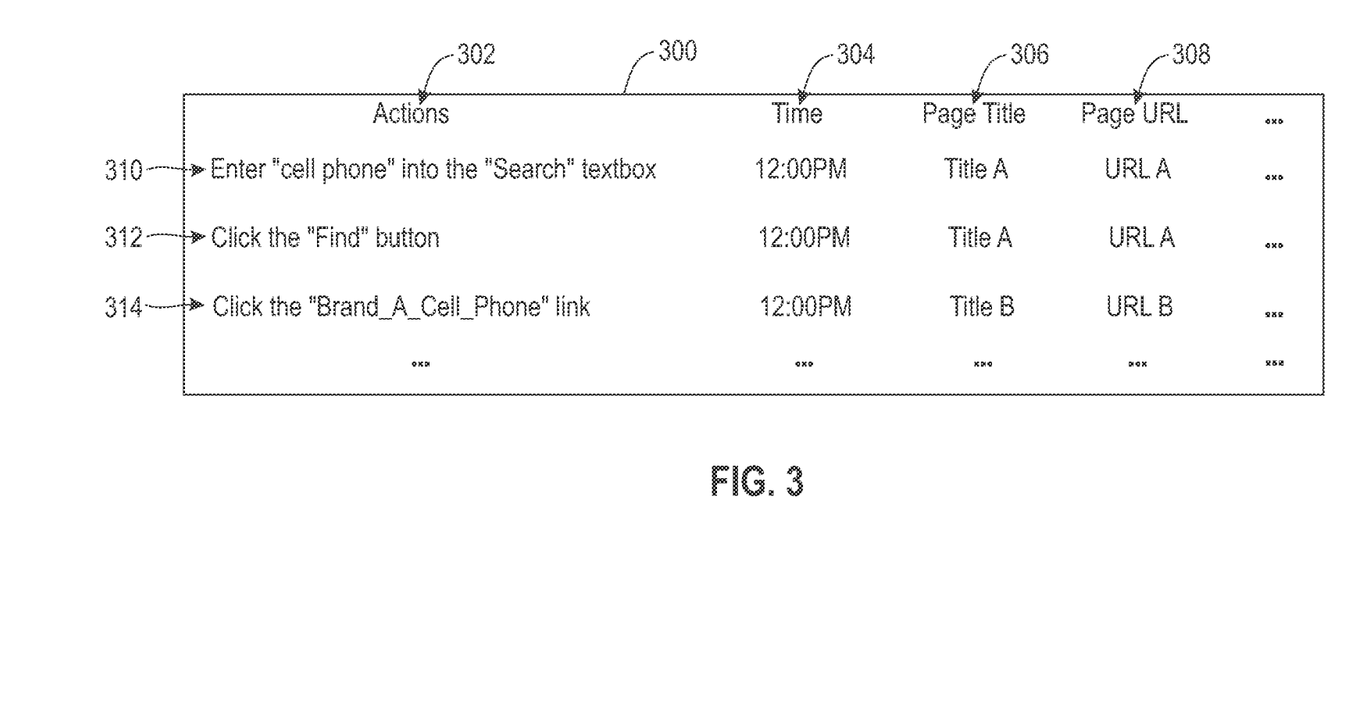
FIG. 3 illustrates one example of web browsing interaction information according to one embodiment of the present invention.
Figure 4:
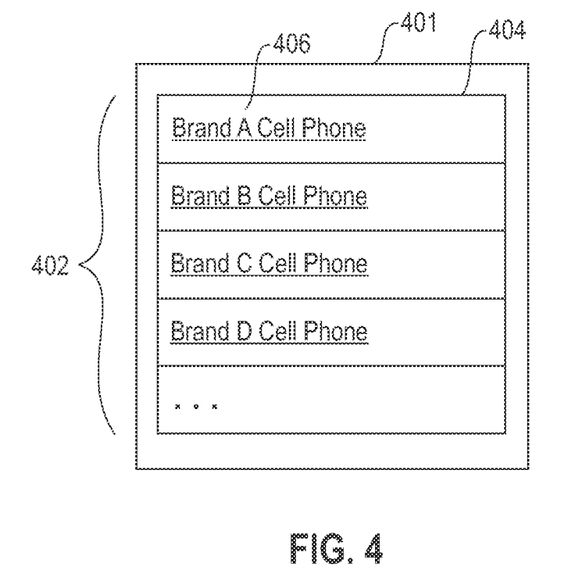
FIG. 4 illustrates one example of search results displayed to a user according to one embodiment of the present invention.

For example, FIG. 3 shows one example, of web browsing interaction information 300 for a given website. In the example shown in FIG. 3, actions 302 performed at a web page of a website, time information 304, web page title information 306, and web page URL information 308 recorded as web browsing interaction information. Other types of information can also be maintained as well. The browsing interaction history 300 shown in FIG. 3 shows interaction logs recorded based on a user's interaction with an on-line merchant. In particular, the browsing interaction history 300 comprises a first recorded interaction 310 indicating that the user entered a search keyword "cell phone" into a "Search" textbox. A second recorded interaction 312 indicates that the user submitted the search form by clicking the "Find" button, which resulted in a search result page being displayed that comprised a list of items that matched the users search query. FIG. 4 shows the first few items 406, 408, 410 for the search result item list 404 in a webpage 402 that was displayed to the user in response to the web server 106 receiving the user's search query of "cell phone". Returning to FIG. 3, the browsing interaction history 300 further comprises a third recorded interaction 314 indicating that the user clicked on the "Brand_A_Cell_Phone" link, which is the first item 406 shown in the list of items 404 of FIG. 4.

Based on the browsing history 300 above, the browsing history analyzer 202 determines that the first and second interactions 310, 312 are associated with a search process. For example, the browsing history analyzer 202 identifies the first and second interactions 310, 312 as being a process for filling out a search form. Once a search process is identified from the browsing history 300, the browsing history analyzer 202 identifies the search results page associated with the search process. For example, the browsing history analyzer 202 identifies the next interaction that occurred after the search process, which is the third interaction 314 (clicking the "Brand_A_Cell_Phone" link") in the current example. The browsing history analyzer 202 analyzes the history information 300 to identify the URL of the web page associated with this next interaction 314, which is URL B in the current example. This web page comprises search results since the page was displayed as a result of the search process.

Based on the identified URL the search results identifier 204 identifies each item in the search results of the web page. For example, the search results identifier 204 identifies the item ("Brand_A_Cell_Phone" link") interacted with (e.g. clicked) by the user from the DOM tree in the DOM 112 of the web page. The search results identifier 204 then computes a presentation pattern based feature of the item's parent element. A bottom-up traversal approach is then utilized by the search results identifier 204 to find the DOM tree node with a repeating pattern such that each pattern represents one item in the list. The identified DOM node with the repeating pattern (e.g., child nodes with a similarity measure, such as matching structures, above a given threshold) is then identified as the item list, e.g., search results, and where each child node of the DOM node is an item within the search results. Therefore, the search results identifier 204 identifies the search results list 404 in the webpage 404 and also identifies each list item 406, 408, 410 within the list 404.

Once the search results list 404 and its list items 406, 408, 410 are identified the search results analyzer 206 analyzes the search results 404 to determine if the search results include target brand information and competitor brand information. For example, the search results analyzer 206 analyzes the brand information 122 to identify brand information such as given brand name, given product name, product type, etc. that is a target of the brand analysis and related competitor information of interest. The search results analyzer 206 compares the identified brand information to each list item in the search results.

For example, based on the brand information 122 the search results analyzer 206 determines brand analysis is to be performed for the Brand_A_Cell_Phone product (i.e., the target) in view of competitor products Brand_B_Cell_Phone and Brand_D_Cell_Phone. Therefore, the search results analyzer 206 analyzes the search results list 404 to determine if the list comprises items corresponding to the target Brand_A_Cell_Phone product and at least one of the competitor products Brand_B_Cell_Phone and Brand_D_Cell_Phone. The search results analyzer 206 can determine if search results include target and competitors item by matching the name of each search result item with an already known name of target and competitor items. Such matching can be exact matching of name (e.g., "AAA 4.0 PY Phone") or can be matching of the brand information in the name of the items (e.g., "AAA"). If the search results analyzer 206 determines that the search result list 404 does not include the target and competitor items of interest then brand analysis is not performed. However, if the search results include only the target item, the search results analyzer 206 can perform brand analysis between the target item and other items (i.e., items that have not been designated as competitor items) in the search results list 404.

If the search result list 404 does include the target and competitor items of interest then the browsing history analyzer 202 analyzes the browser history information 300 to determine if the user selected the target item, a competitor's item, another item, or performed some additional action when the user was presented the search results list. For example, the history 300 shown in FIG. 3 shows that the next action performed by the user after being shown the search results list 404 was the selection (e.g., clicking) of the link in the search results list 404 for the target Brand_A_Cell_Phone.

Therefore, the brand analysis information generator 208 increments a counter associated with the target item Brand_A_Cell_Phone to indicate that the user has selected the target item. Counters associated with the competitor items Brand_B_Cell_Phone and Brand_D_Cell_Phone are not incremented since the user did not select these items. It should be noted that other information can be recorded by the brand analysis information generator 208 information as well. For example, the brand analysis information generator 208 can record all the items/brands that were included in a search results list that included the target item/brand; the number of times a given combination of target item/brand and competitor items/brand occurred within search results and the selection ratio thereof; etc. For example, the brand analysis information generator 208 can record that the target item Brand_A_Cell_Phone and competitor items Brand_B_Cell_Phone and Brand_D_Cell_Phone occurred in search results together a given number of times and that Brand_A_Cell_Phone was selected X times, Brand_B_Cell_Phone was selected Y times, and Brand_D_Cell_Phone was selected Z times.

Figure 5:
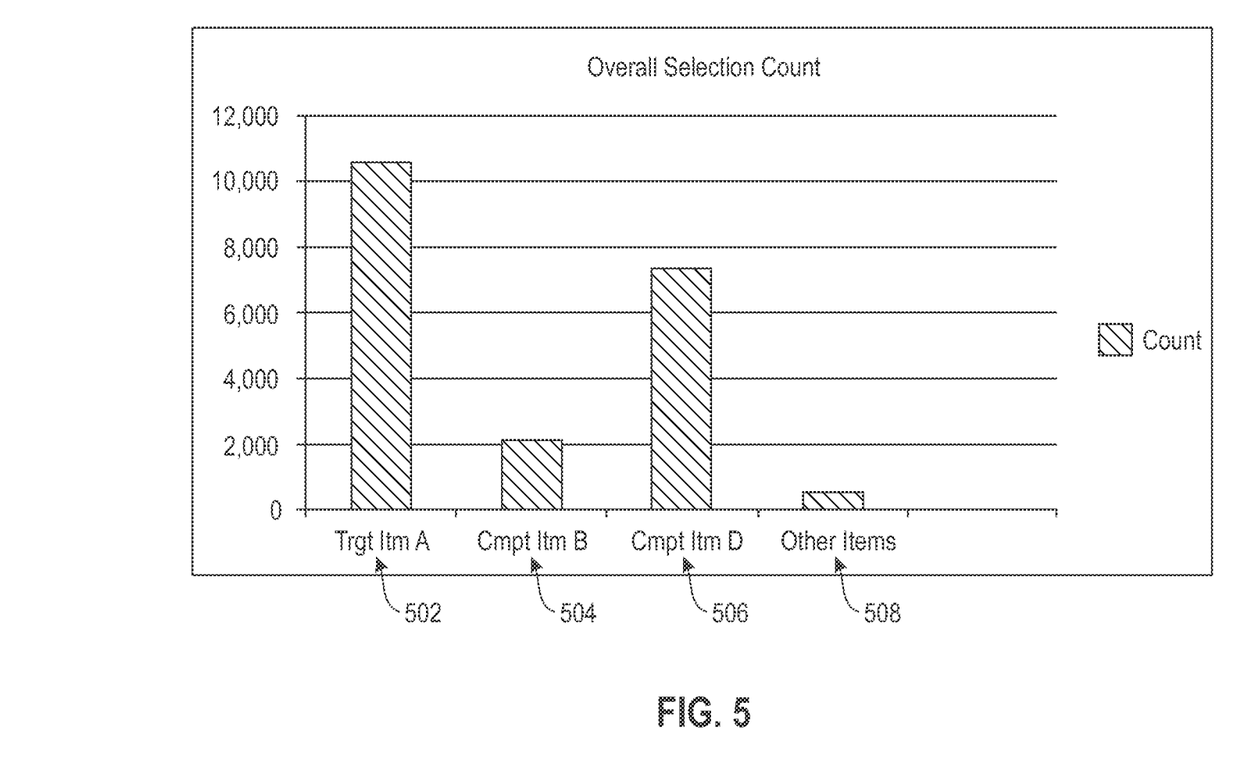
FIG. 5 illustrates one example of brand analysis information generated based on a user's interactions with search results according to one embodiment of the present invention.

FIG. 5 shows one example of brand analysis information 124 generated by the brand analysis manager 120. It should be noted that even though FIG. 5 shows the brand analysis information 124 being displayed in a chart format, the brand analysis information 124 can be stored as, transformed into, or presented using any format. As discussed above, the brand analysis information 124 is generated based on identifying when a user selects a target item, a competitor item, or another item when a target item and at least one competitor item are within the same search result list. However, it should be noted that embodiments of the present invention are not limited a pre-designated competitor item and any item (or non-related item) presented in a search results list in addition to a target item can be considered a competitor item.

Figure 6:
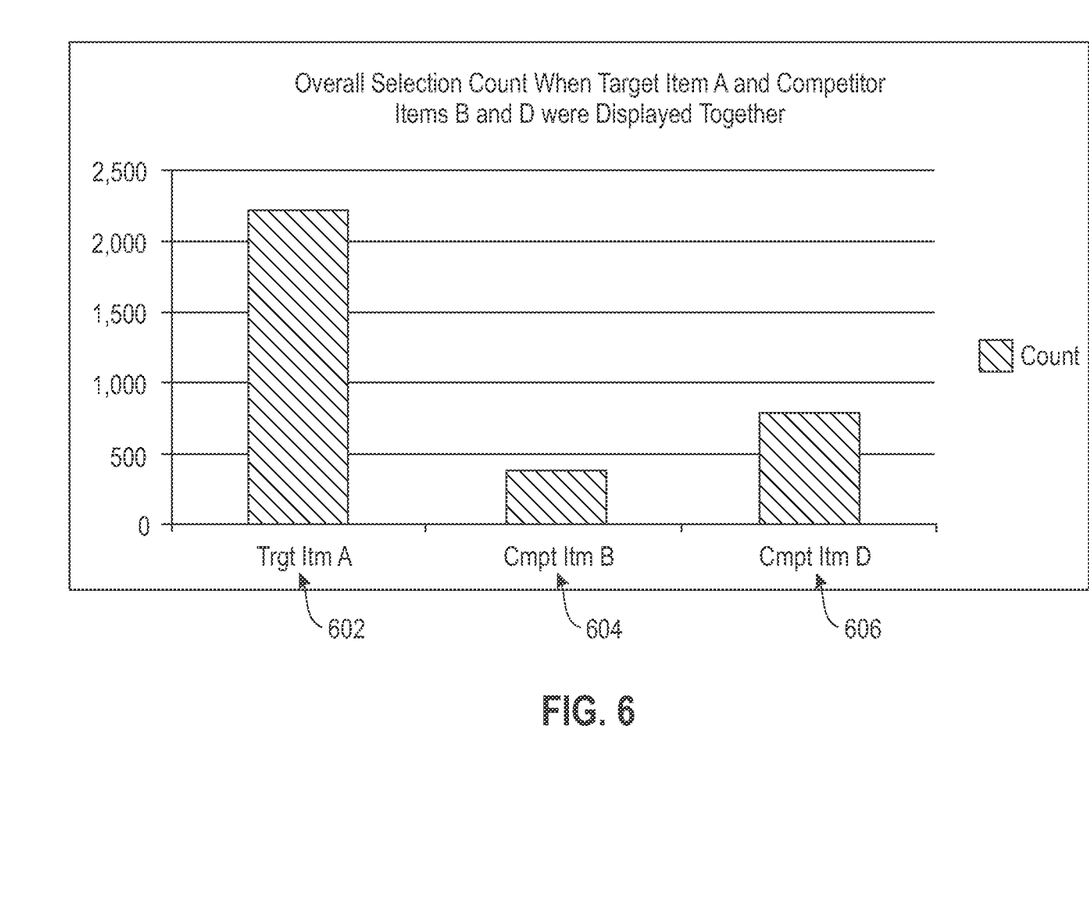
FIG. 6 illustrates another example of brand analysis information generated based on a user's interactions with search results according to one embodiment of the present invention.

The brand analysis information 124 in the example of FIG. 5 shows overall selection information between a given target item 502 (Brand_A_Cell_Phone), each of its competitor items 504, 506, and optional other items 508. In other words, this over selection information provides a selection count when the target item 502 was included a search results with any combination of the competitor/other items 504, 506, 508. FIG. 6 shows another example of brand analysis information 124. In this example, selection count information is displayed for a given combination of target/competitor items in search results. For example, FIG. 6 shows the overall selection count for a given target item 602 (Brand_A_Cell_Phone) and given competitor items 604, 606 (Brand_B_Cell_Phone and Brand_D_Cell_Phone) when the given target item 602 and the competitor items 606, 608 were included in the same search results. As discussed above, the brand analysis information 124 can also indicate how many search results included a given combination of the target item 602 and the competitor items 606, 608.

Operational Flow Diagrams

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
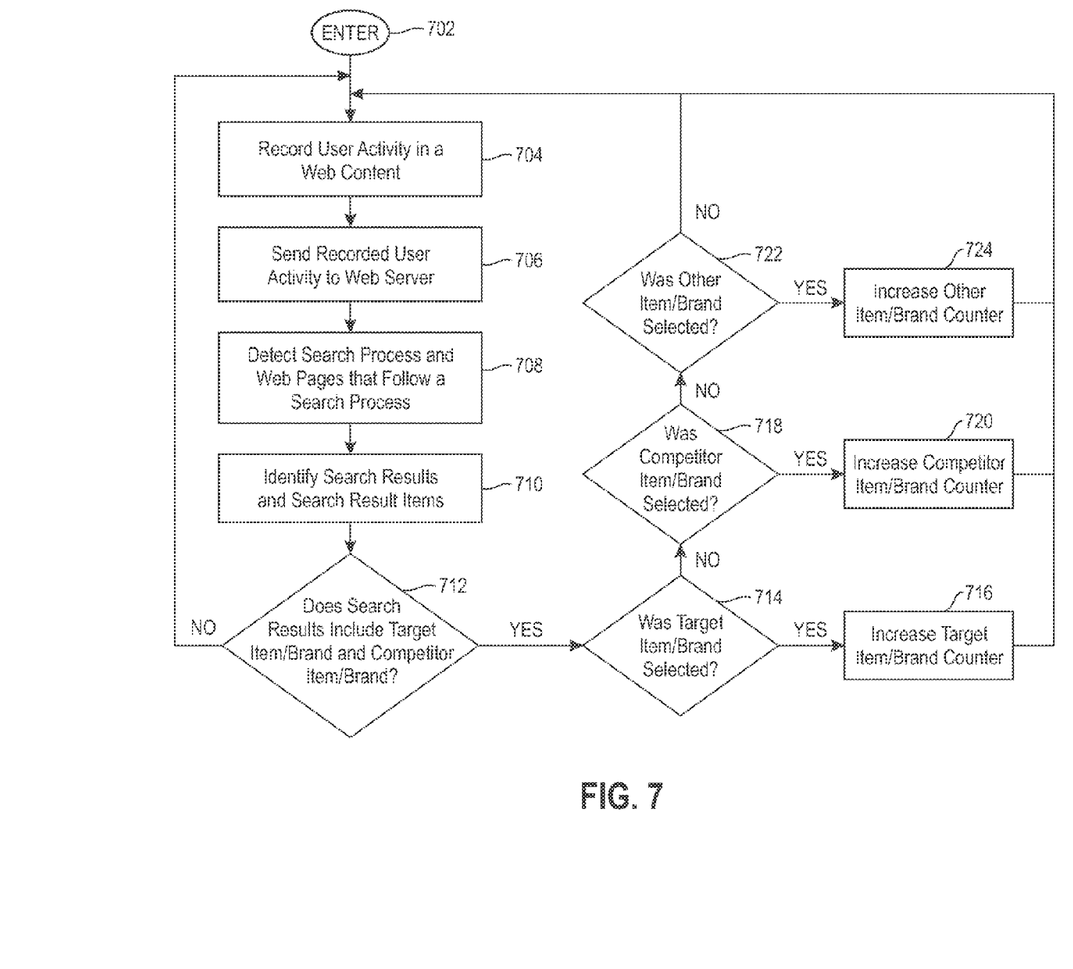
FIG. 7 is operational flow diagrams illustrating one example of a process for brand analysis information generated based on a user's interactions with search results according to one embodiment of the present invention.

FIG. 7 is an operational flow diagram illustrating one example of generating brand analysis information based on users' interactions with search results. It should be noted that a more detailed discussion with respect to this process has already been given above with respect to FIGS. 2-6. The operational flow of FIG. 7 starts at step 702 and flows directly into step 704. A browsing monitor 116, at step 704, monitors and records a user's interactions with web content 110 (e.g., website, webpage, etc.) associated with the browsing monitor 116. In one embodiment, the browsing monitor 116 is a script that is embedded within a web page and is executed when the web page is rendered in the user's web browser 114. The browsing monitor 116, at step 706, then sends the recorded user interactions to the web server 106 (or server comprising the brand analysis manager 120). The user interactions are then stored as browsing history information (web usage logs) 118.

The brand analysis manager 120, at step 708, analyzes the browsing history information 118 and detects search processes performed by a user and the web pages resulting from the search process. The brand analysis manager 120, at step 710, analyzes the web pages resulting from the search processes and identifies search results 404 and their items 406, 408, 410. The brand analysis manager 120, at step 712, determines if any of the search results items 406, 408, 410 correspond to a brand analysis target item/brand and at least one competitor item/brand. If the result of this determination is negative, the control flow returns to step 704. If the result of this determination is positive, the brand analysis manager 120, at step 714, determines (based on the browsing history information 118) if the target item/brand was selected from the search results.

If the target item/brand was selected from the search results, the brand analysis manager 120, at step 716, records this selection and increases a target item/brand selection counter. The control flow then returns to step 704. If the target item/brand was not selected from the search results, the brand analysis manager 120, at step 718, determines if the user selected a competitor item/brand from the search results. If so, the brand analysis manager 120, at step 720, records this selection and increases a competitor item/brand selection counter. The control flow then returns to step 704. If the user did not select a competitor item/brand, the brand analysis manager 120, at step 722, determines if the user selected another item/brand from the list that is neither a target item nor a competitor item. If the result of this determination is negative (e.g., the user did not select any items) the control flow returns to step 702. If the user did select another item/brand from the list, the brand analysis manager 120, at step 724, records this selection and increases selection counter for other items/brands. The control flow then returns to step 704.

Information Processing System

Figure 8:
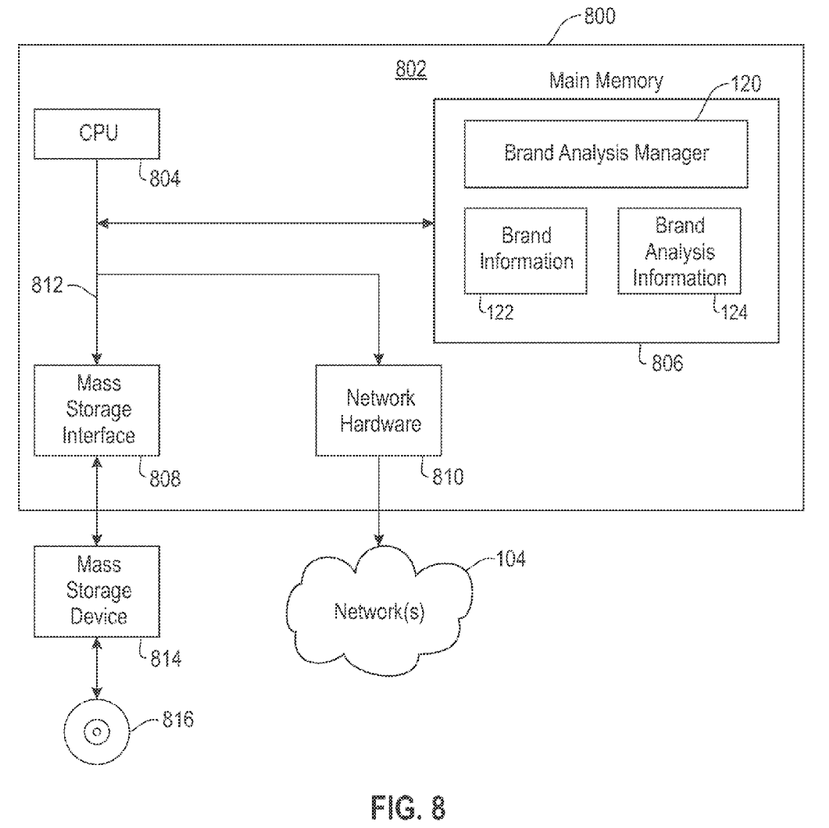
FIG. 8 is a block diagram illustrating a detailed view of an information processing system according to one embodiment of the present invention.

Referring now to FIG. 8, this figure is a block diagram illustrating an information processing system that can be utilized in embodiments of the present invention. The information processing system 800 is based upon a suitably configured processing system adapted to implement one or more embodiments of the present invention (e.g., the server system 106 of FIG. 1). Any suitably configured processing system can be used as the information processing system 800 in embodiments of the present invention.

The information processing system 800 includes a computer 802. The computer 802 has a processor(s) 804 that is connected to a main memory 806, mass storage interface 808, and network adapter hardware 810. A system bus 812 interconnects these system components. Although only one CPU 804 is illustrated for computer 802, computer systems with multiple CPUs can be used equally effectively. The main memory 806, in this embodiment, comprises the brand analysis manager 120, the brand information 122, and the brand analysis information 124 discussed above. In another embodiment, the brand analysis manager 120 can reside within the processor 804, or be a separate hardware component.

The mass storage interface 808 is used to connect mass storage devices, such as mass storage device 814, to the information processing system 800. One specific type of data storage device is an optical drive such as a CD/DVD drive, which can be used to store data to and read data from a computer readable medium or storage product such as (but not limited to) a CD/DVD 816. Another type of data storage device is a data storage device configured to support, for example, NTFS type file system operations.

An operating system included in the main memory is a suitable multitasking operating system such as any of the Linux, UNIX, Windows, and Windows Server based operating systems. Embodiments of the present invention are also able to use any other suitable operating system. Some embodiments of the present invention utilize architectures, such as an object oriented framework mechanism, that allows instructions of the components of operating system to be executed on any processor located within the information processing system 800. The network adapter hardware 810 is used to provide an interface to a network 104. Embodiments of the present invention are able to be adapted to work with any data communications connections including present day analog and/or digital techniques or via a future networking mechanism.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A system comprising:
    memory;
    a processor communicatively coupled to the memory; and
    a brand analysis manager communicatively coupled to the memory and the processor, the brand analysis manager is configured to:
        analyze a set of web browsing interaction information;
        determine, based on the analyzing, that at least one search process was performed by at least one user;
        access, based on the set of web browsing interaction information, a web page comprising a search result list associated with the at least one search process, the search result list comprising a set of items corresponding to at least one search process;
        analyze the at least one search result list;
        determine that the set of items in the at least one search result list comprises at least one item corresponding to a brand analysis target item and also comprises at least one other item;
        determine, based on the web browsing interaction information, that the at least one user performed a selection of one of the brand analysis target item and the other item from the at least one search result list;
        record the selection by the at least one user; and
        generate a brand analysis metric based on the recording, wherein the brand analysis metric indicates a ratio of selections by the at least one user between the brand analysis target item and the at least one other item.

2. The system of claim 1, wherein the brand analysis manager is configured to determine that the at least one user performed the selection based on:
    analyzing the set of web browsing interaction information;
    identifying, based on the analyzing, at least one action performed by the at least one user with respect to the at least one search result list; and
    determining that the at least one action indicates the selection by the at least one user of one of the brand analysis target item and the other item from the search results list.

3. The system of claim 1, wherein the brand analysis manager is further configured to:
    identify the at least one search result list in the web page based on:
    analyzing the set of web browsing interaction information, wherein the set of web browsing interaction information comprises a plurality of actions performed by the at least one user with respect to web pages in a website;
    identifying, based on the analyzing, a search action performed by the at least one user, wherein the search action corresponds to the at least one search process; and
    retrieving a web page associated with the action, as indicated by the set of web browsing interaction information, performed by the at least one user immediately after the search action, wherein the web page is the web page comprising the at least one search list.

4. The system of claim 3, wherein identifying the at least one search result list in the web page is further based on:
    determining a presentation pattern of search results for the web page;
    constructing a document object model (DOM) tree of web page;
    analyzing the DOM tree with respect to the presentation pattern; and
    identifying, based on the analyzing, a DOM node in the DOM tree comprising the presentation pattern based on a similarity between child nodes of the DOM node, wherein the DOM node corresponds to the at least one search result list, and wherein each child node of the DOM node corresponds to an item in the at least one search result list.

5. The system of claim 1, wherein the brand analysis manager is configured to record by:
increasing a counter associated with the one of the brand analysis target item and the other item from the search results list in response to the selection thereof by the user.

6. The system of claim 1, wherein the brand analysis metric indicates a ratio between selections of the brand analysis target item and the other item when the brand analysis target item and the other item were presented in the same search result list.

7. A non-transitory computer program product comprising a non-transitory computer readable storage medium having computer readable program code embodied therewith, the computer readable program code configured to:
analyze a set of web browsing interaction information;
determine, based on the analyzing, that at least one search process was performed by at least one user;
access, based on the set of web browsing interaction information, a web page comprising a search result list associated with the at least one search process, the search result list comprising a set of items corresponding to at least one search process;
analyze the at least one search result list;
determine that the set of items in the at least one search result list comprises at least one item corresponding to a brand analysis target item and also comprises at least one other item;
determine, based on the web browsing interaction information, that the at least one user performed a selection of one of the brand analysis target item and the other item from the at least one search result list;
record the selection by the at least one; and
generate a brand analysis metric based on the recording, wherein the brand analysis metric indicates a ratio of selections by the at least one user between the brand analysis target item and the at least one other item.

8. The non-transitory computer program product of claim 7, wherein the computer readable program code is configured to determined that the at least one user performed the selection based on:
analyzing the set of web browsing interaction information,
identifying, based on the analyzing, at least one action performed by the at least one user with respect to the at least one search result list; and
determining that the at least one action indicates the selection by the at least one user of one of the brand analysis target item and the other item from the search results list.

9. The non-transitory computer program product of claim 7, wherein the computer readable program code is further configured to:
identify the at least one search result list in the web page based on:
analyzing the set of web browsing interaction information, wherein the set of web browsing interaction information comprises a plurality of actions performed by the at least one user with respect to web pages in a website;
identifying, based on the analyzing, a search action performed by the at least one user, wherein the search action corresponds to the at least one search process; and
retrieving a web page associated with the action, as indicated by the set of web browsing interaction information, performed by the at least one user immediately after the search action, wherein the web page is the web page comprising the at least one search list.

10. The non-transitory computer program product of claim 9, wherein the computer readable program code is further configured to identify the at least one search result list in the web page based on:
determining a presentation pattern of search results for the web page;
constructing a document object model (DOM) tree of web page;
analyzing the DOM tree with respect to the presentation pattern; and
identifying, based on the analyzing, a DOM node in the DOM tree comprising the presentation pattern based on a similarity between child nodes of the DOM node, wherein the DOM node corresponds to the at least one search result list, and wherein each child node of the DOM node corresponds to an item in the at least one search result list.

11. The non-transitory computer program product of claim 7, wherein the computer readable program code is configured to record by:
increasing a counter associated with the one of the brand analysis target item and the other item from the search results list in response to the selection thereof by the user.

12. The non-transitory computer program product of claim 7, wherein the brand analysis metric indicates a ratio between selections of the brand analysis target item and the other item when the brand analysis target item and the other item were presented in the same search result list.

13. The non-transitory computer program product of claim 7, wherein the other item is a competitor item of the target item.

* * * * *